US012742669B2

(12) United States Patent
Shapira et al.

(10) Patent No.: US 12,742,669 B2
(45) Date of Patent: Sep. 22, 2026

(54) OPTICAL MEASUREMENT OF FLOW PARAMETERS

(71) Applicant: FLOWLIT LTD, Rehovot (IL)

(72) Inventors: Joseph Shapira, Ashdod (IL); Abraham Englander, Rehovot (IL); Tuvia Segal, Haifa (IL)

(73) Assignee: FLOWLIT LTD, Rehovot (IL)

( * ) Notice: Subject to any disclaimer, the term of this patent is extended or adjusted under 35 U.S.C. 154(b) by 885 days.

(21) Appl. No.: 17/995,598

(22) PCT Filed: Apr. 4, 2021

(86) PCT No.: PCT/IB2021/052800

§ 371 (c)(1),
(2) Date: Oct. 6, 2022

(87) PCT Pub. No.: WO2021/205317

PCT Pub. Date: Oct. 14, 2021

(65) Prior Publication Data

US 2023/0160730 A1 May 25, 2023

Related U.S. Application Data

(60) Provisional application No. 63/005,552, filed on Apr. 6, 2020.

(51) Int. Cl.
*G01F 1/7086* (2022.01)
*G01F 1/66* (2022.01)
(Continued)

(52) U.S. Cl.
CPC ............ *G01F 1/7086* (2013.01); *G01F 1/661* (2013.01); *G01F 1/662* (2013.01); *G01N 11/04* (2013.01)

(58) Field of Classification Search
None
See application file for complete search history.

(56) References Cited

U.S. PATENT DOCUMENTS 5,333,044 A 7/1994 Shaffer
6,013,921 A * 1/2000 Moller .................... G01P 5/001 250/573

(Continued)

FOREIGN PATENT DOCUMENTS

CN 110231068 9/2019
JP 1980078232 6/1980

(Continued)

OTHER PUBLICATIONS

Kumara, W. A. S., B. M. Halvorsen, and M. C. Melaaen. "Particle image velocimetry for characterizing the flow structure of oil-water flow in horizontal and slightly inclined pipes." Chemical Engineering Science 65.15 (2010): 4332-4349 (Year: 2010).*

(Continued)

*Primary Examiner* — Luke D Ratcliffe
(74) *Attorney, Agent, or Firm* — A.C. Entis-IP Ltd; Allan C. Entis

(57) ABSTRACT

A method of fluid flow measurement includes a emitting a light beam into a pipe through which a fluid flows, the light beam illuminating the fluid flowing in the pipe, using a light detector array to detect light caused by scattering of the beam with particles found in the fluid, the light beam being outside a field of view of the light detector array, dividing the field of view of the light detector array into layers, and determining an instantaneous flow velocity in each of the layers as a function of signals transmitted from the light detector array in each of the layers.

8 Claims, 1 Drawing Sheet

(51) Int. Cl.
*G01F 1/661* (2022.01)
*G01N 11/04* (2006.01)

(56) References Cited

U.S. PATENT DOCUMENTS

| | | | | |
|---|---|---|---|---|
| 2001/0040214 | A1 | 11/2001 | Friedman et al. | |
| 2020/0064169 | A1 | 2/2020 | Kato et al. | |
| 2022/0404334 | A1* | 12/2022 | Gurkan | C07K 14/70525 |

FOREIGN PATENT DOCUMENTS

| | | |
|---|---|---|
| JP | H08313549 | 11/1996 |
| JP | H0933302 | 2/1997 |
| JP | 1998311748 | 11/1998 |
| JP | 2018077050 | 5/2018 |
| KR | 100807372 | 2/2008 |

OTHER PUBLICATIONS

PCT Search Report and Written Opinion PCT/IB2021/052800, Aug. 13, 2021.

Kumara W A S et al: "Particle image velocimetry for characterizing the flow structure of oil-water flow in horizontal and slightly inclined pipes", Chemical Engineering Science, Oxford, GB, vol. 65, No. 15, Aug. 1, 2010 (Aug. 1, 2010), pp. 4332-4349, XP027075078, ISSN: 0009-2509, [retrieved on Jun. 3, 2010], DOI: 10.1016/J.CES.2010.03.045.

Van Der Plas Boaz et al: "Flow induced viscoelasticity in fractures", Experimental Thermal and Fluid Science, Elsevier, Amsterdam, NL, vol. 79, Jul. 14, 2016 (Jul. 14, 2016), pp. 238-244, XP029706081, ISSN: 0894-1777, DOI: 10.1016/J.EXPTHERMFLUSCI.2016.07.018.

European Office Action Dated Feb. 10, 2026 for Application No. 21729626.8 file Apr. 4, 2021.

Korean Office Action Dated Jan. 28, 2026 for Application No. 10-2022-7036712 filed Oct. 21, 2022.

Japanese Office Action Dated Jan. 6, 2026 for Application No. 2022-561382 filed Apr. 4, 2021.

* cited by examiner

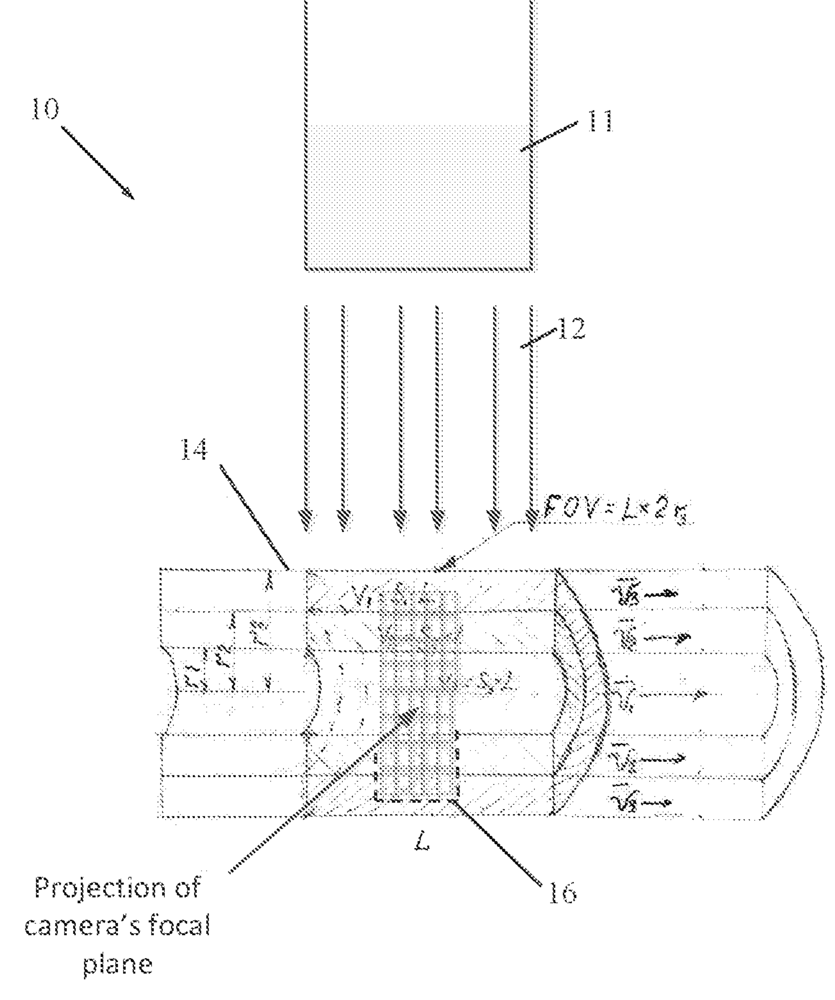
10
11
12
14
FOV = L×2r
L
16
Projection of camera's focal plane

OPTICAL MEASUREMENT OF FLOW PARAMETERS

FIELD OF THE INVENTION

The present invention relates generally to fluid flow measurement and in particular to an optical fluid flow measurement assembly and method.

BACKGROUND OF THE INVENTION

PCT Patent Application PCT/IB2020/050557 describes optical apparatus containing a single continuous wave light source placed outside the pipe such as a light emitting diode (LED) emitting a narrow pencil-like beam or a beam in the form of a light sheet which illuminates the flow through a window in the pipe and a multiplicity of light detectors such a two-dimensional CCD array disposed along the axis of the flow outside the pipe in such a way that the emitted beam does not impinge on the detector array. The intersection of the light beam with the field of view of the CCD array determines the measurement volume of the device. The scattered light by small particles passing through the beam in the measurement volume is collected by a collection lens that focuses the collected light onto the light detectors which record in a continuous manner the signal created by the collected light. The velocity of the flow is determined by analyzing the recorded time varying signal by mathematical methods such as the cross-correlation method or time-of-flight method or by machine-learning algorithms.

SUMMARY OF THE INVENTION

The present invention seeks to provide a simple, robust and non-invasive optical method for providing in-line measurements of the local velocity profile of liquids and gases flowing in a pipe for laminar, turbulent and intermediate flow regimes.

In one aspect of the invention, an optical method is provided for accurate in-line measurement of the volume and the mass flowrate of a liquid flowing through a pipe for laminar, turbulent and intermediate flow regimes.

In one aspect of the invention, an optical method is provided for in-line measurement of the local velocity profiles of components of two-phase or multi-phase liquids and gases flowing through a pipe in laminar, or turbulent or intermediate flow regimes.

In one aspect of the invention, an optical in-line method is provided that measures separately the volume and mass flowrate of each component of a multi-phase liquid flowing through a pipe in laminar, turbulent or intermediate flow regimes.

One aspect of the invention is to make an optical, non-invasive apparatus available that can provide the velocity profile, mass flowrate and volume flowrate for each component of a multi-phase liquid flowing through a pipe in laminar, turbulent and intermittent flow regimes.

In one aspect of the invention an optical system provides in-line a visual map of the velocity profile of a liquid or a gas flowing in a pipe and can also provide a visual map of the velocity profile of the components of a multi-phase liquid flowing in a pipe.

There is thus provided in accordance with an embodiment of the invention a fluid flow measurement method including a emitting a light beam into a pipe through which a fluid flows, the light beam illuminating the fluid flowing in the pipe, using a light detector array to detect light caused by scattering of the beam with particles found in the fluid, the light beam being outside a field of view of the light detector array, dividing the field of view of the light detector array into layers, and determining an instantaneous flow velocity in each of the layers as a function of signals transmitted from the light detector array in each of the layers.

BRIEF DESCRIPTION OF THE DRAWINGS

The present invention will be understood and appreciated more fully from the following detailed description, taken in conjunction with the drawings in which:

FIG. 1 is a simplified illustration of an optical fluid flow velocity measurement system, in accordance with a non-limiting embodiment of the present invention.

DETAILED DESCRIPTION

Reference is now made to FIG. 1, which illustrates an optical fluid flow velocity measurement system 10, in accordance with a non-limiting embodiment of the present invention.

The system and method measure the instantaneous and average velocity profile together with the mass flowrate and volume flowrate of fluids flowing through a pipe section during a short time interval. This provides high measurement accuracy regardless of the spatial or temporal heterogeneity of the flow rate.

In FIG. 1, a light source 11 emits a monochromatic light sheet 12, which is projected (via a first window, which could be part of the pipe) across a pipe section 14, preferably at the center of the pipe though which the liquid flows. A light detector array, such as a digital camera 16 (shown partially in broken lines), disposed perpendicularly to the light propagation direction (at a second window, which could be part of the pipe) records the illuminated flow by recording the scattered signal from particulates in the flowing liquid. The vertical dimension of the projection of the camera's focal plane field of view covers a significant part of the inner pipe diameter.

The field of view of the camera is virtually divided along the vertical axis into horizontal layers whose width is selected so that the volume of liquid in the resulting cylindrical layers may be equal (this is not essential to the invention and they can be unequal). The division scheme is shown in FIG. 1 with an example of three layers with width r1, r2 and r3. The instantaneous flow velocity in each layer is determined by analysis of adjacent frames either by the time-of-flight method, correlation method or machine-learning algorithms. The measured values of the instantaneous fluid transfer velocity vectors in each layer may be different, depending on the nature of the flow. Generally near the walls it has a lower value, (indicated in the figure by $\overline{v_3}$), whereas at the pipe axis it has the largest value (indicated in the figure $v_1$), with intermediate values at layers in between (indicated by $v_2$ in the figure). The volumes of the layers in the field of view are indicated by V3, V1 and V2, respectively.

The invention is not limited to horizontal layers and the layers may be defined in other ways and in other coordinate systems, such as polar or spherical.

The values of the instantaneous velocities in each layer can be used to map the local velocities distribution of the flow. Additionally, by measuring the changes in the velocities distribution map one can derive the changes in the fluid viscosity over time.

The time interval for the instantaneous velocity measurement is determined by the frame rate of the camera and number of adjacent frames required for the measurement and is in the order of a few tens of milliseconds or less. The measured instantaneous values for each layer are then averaged over a time interval T which reflects the variability of the flow regime and the temporal behavior of the pressure at the inlet of the pipe, which generally vary from hundreds of milliseconds to several minutes. The obtained average velocity values for each layer ($v_{i\,av}$) are subsequently used to determine the total mass M flow during the selected time interval T. This is done by determining the mass $m_i$ that was transferred during time T through the layer i by the formula $$m_i=\rho^{\star}Si^{\star}vi_{av}*T$$

where ρ denotes the fluid density and $S_i$ denotes the area of the i-th layer.

By summing the mass of all layers, one obtains the total mass transferred during time interval T. It should be noted that the instantaneous and average velocity values represent the instantaneous and average velocity profiles, respectively, and represent the regime of the flow. This method is therefore not limited to a specific flow regime and can be applied to flows in the laminar, turbulent or intermediate regimes.

It should be also noted that the accuracy of the average velocity in each layer is approximately equal to the accuracy of the instantaneous velocity measured in the same layer, which can reach very high values. The larger the number of the virtual layers, the more accurate value of the transferred mass is obtained and the accuracy of the average flow velocity V corresponding to the total mass (V=M/ρST, where S is the pipe cross section) will approach the measurement tolerance of the instantaneous flow velocity in a single layer.

This method can be also extended to a multiphase flow since the optical characteristics of each phase are generally significantly different. Changes in indices of refraction between the flows and in scattering intensities can be conveniently tagged by appropriate image-analysis algorithms and this method can be applied separately to each phase.

What is claimed is:

1. A fluid flow measurement method comprising:

emitting a light beam having a form of a light sheet into a pipe through which a fluid flows, said light beam illuminating the fluid flowing in said pipe;

using a light detector array to detect light caused by scattering of said beam with particles found in said fluid, said light beam being outside a field of view of said light detector array;

dividing the field of view of said light detector array into layers that intersect the light sheet at cross sections of equal volume cylindrical shells of the flowing fluid; and determining an instantaneous flow velocity for each of said equal volume cylindrical shells as a function of signals transmitted from said light detector array for each of said associated cross sections.

2. The method according to claim 1, comprising using said instantaneous velocities of said 1 equal volume cylindrical shells to create a map a distribution of local velocities of the fluid flowing in the pipe.

3. The method according to claim 2, comprising measuring changes in said map over time to derive changes in viscosity of the fluid over time.

4. The method according to claim 1, wherein a time interval for each of the instantaneous velocity measurements is determined by a frame rate of said light detector array and a number of adjacent frames required for the instantaneous velocity measurement.

5. The method according to claim 4, averaging said instantaneous velocity measurements for each of said equal volume cylindrical shells over a time interval to determine a variability of flow regime and temporal behavior of pressure at an inlet of the pipe.

6. The method according to claim 1, comprising taking into consideration a density of said fluid and said instantaneous flow velocity in each of said equal volume cylindrical shells to calculate a mass flow rate in each of said equal volume cylindrical shells.

7. The method according to claim 6, comprising summing said mass flow rates to determine total mass flow rate.

8. The method according to claim 6, comprising using said mass flow rates to determine average mass flow rate.

* * * * *